United States Patent [19]
Greene et al.

[11] Patent Number: 5,668,569
[45] Date of Patent: Sep. 16, 1997

[54] TILED, FLAT-PANEL DISPLAYS WITH LUMINANCE-CORRECTING CAPABILITY

[75] Inventors: Raymond G. Greene, Ovid; Robert H. Katyl, Vestal; J. Peter Krusius; Boris Yost, both of Ithaca, all of N.Y.

[73] Assignee: Rainbow Displays Inc., Endicott, N.Y.

[21] Appl. No.: 628,308

[22] Filed: Apr. 5, 1996

[51] Int. Cl.⁶ .................................................. G09G 3/36
[52] U.S. Cl. ............................................ 345/103; 345/903
[58] Field of Search ................................ 345/1, 2, 3, 87, 345/103, 903

[56] References Cited

U.S. PATENT DOCUMENTS 5,293,159  3/1994  Bassetti, Jr. et al. ................. 345/1
5,523,769  6/1996  Lauer et al. ............................ 345/1

Primary Examiner—Kee M. Tung
Assistant Examiner—Matthew Luu
Attorney, Agent, or Firm—Salzman & Levy

[57] ABSTRACT

The present invention features a tiled, flat-panel, mosaic display with a luminance-correcting capability and having a seamlessness characteristic. Column and row inputs that are typically provided for a single flat panel are distributed over a number of tiles. The display is fabricated by sorting the tiles into groups, and matching their color coordinates prior to assembly. After assembly, measurements of the luminance of the display are processed to generate correction data, which is compressed into a reduced set of coefficients. A processor, located between a video controller and the display drivers for each of the tiles, has a memory containing these interpolation coefficients for correcting luminance in the tiles. A multiplicity of processing units is connected to the video controller and the processor for performing video correction in real time.

20 Claims, 4 Drawing Sheets

TILED, FLAT-PANEL DISPLAYS WITH LUMINANCE-CORRECTING CAPABILITY

FIELD OF THE INVENTION

The invention pertains to flat-panel electronic displays and, more particularly, to a flat-panel, electronic color display with a luminance-correcting capability, a display that is assembled by piecing together a plurality of tiles.

BACKGROUND OF THE INVENTION

Images on electronic displays are derived from an array of small picture elements known as pixels. In color displays, these pixels comprise three color elements that produce primary colors red, blue and green, typically. Usually arranged as squares or rectangles, these pixels can be characterized by pixel pitch, P, a quantity that measures the density of pixels per unit distance. A typical cathode-ray tube has a pixel pitch of 0.3 mm. Typical small computer screens have a width:height ratio of 4:3. Two common arrangements for pixel arrays for computer displays are the 640×480 and the 1024×768 configuration.

Large displays using LCD technology are recognized as being difficult to manufacture. It has been suggested that large displays can be manufactured by assembling a plurality of display tiles. Such tiles are characterized by visually disturbing seams resulting from gaps between adjacent pixels on the same and/or adjacent tiles. Thus, the image portrayed by using a seamed panel appears segmented and disjointed. Therefore, it is desirable to fabricate a tiled, flat-panel display which does not have noticeable or perceptible seams.

The pixel pitch in electronic displays is set so that the minimum viewing distance will produce an imperceptible seam. With a pixel pitch P=0.3 mm, the minimum viewing distance is on the order of one meter. The minimum viewing distance will increase with the pixel pitch; therefore, when designing for the purpose of visually eliminating the seams, there is very little latitude in selecting the pixel pitch.

Flat-panel displays include liquid crystal displays (LCDs), active matrix LCDs (AMLCDs), plasma displays (PDs), field emission displays (FEDs), electroluminescent displays (ELDs) and digital mirror displays (DMDs), all of which depend on the microfabrication of the key components carrying the pixel patterns. AMLCD is a technology currently favored by the industry. For purposes of clarity, the term "LCD" is used herein, but is intended to describe all flat-panel displays.

From a practical point of view, the microfabrication yield is unacceptable for large displays, due to the unacceptable number of manufacturing rejections. The inventors, therefore, have determined that small pixel arrays (tiles) can be microfabricated and, after appropriate selection, assembled together to form a larger display configuration. However, past attempts to accomplish this have led to visible seams, due, in large part, to the dimensions required by tile assembling, which goes beyond even the pixel spacing required of monolithic displays. This is essentially why few attempts have been made to achieve large, color, "seamless", tiled panels.

In co-pending U.S. patent applications Ser. Nos. 08/593,759 and 08/571,208, which were filed on Jan. 29, 1996, and Dec. 12, 1995, respectively, a method of constructing a seamless, tiled, flat-panel display is illustrated. The teachings of these companion applications are meant to be incorporated herein by way of reference.

The present invention provides unique hardware and a method for achieving luminance correction in a "seamless", tiled display, comprising a tiled mosaic of individual LCDs. In a commercially acceptable tiled display, the color and brightness have to be uniform for each tile, i.e., over the entire range of input video signals to be rendered, there should be no apparent differences in brightness or color between tiles.

There are several sources of inter-tile color differences, including differences in the color coordinates between tiles, threshold and transmission voltages at the seams, etc.

Moreover, the optical performance of the display can be characterized by parameters that describe the voltage input to picture elements (pixels) and the resulting transmission of the elements. For example, AMLCDs have threshold voltages $V_{TH}$ and $V_{DMUX}$ for maximum and minimum transmission, $T_{max}$ and $T_{min}$. The pixel optical gain, $V_{SL}$, can be described as the slope of the transmission-voltage curve. Color coordinates may also vary. A similar set of parameters can be identified for other types of flat-panel displays. In the extension to tiled displays, additional parameters related to the quality of the display near the edge can be identified, for example, due to the filling of the liquid crystal material. Other optical components of the display may also vary.

The method of this invention takes into account the condition in a tiled display where the color coordinates between tiles are approximately constant, but the transmission of light through the pixel assemblies slowly varies across a tile for each primary color and, additionally, differs from tile to tile. In particular, with this invention, the inventors seek to correct discontinuities in primary-color luminance at border regions.

The inventors have also developed a method of characterizing spatial pixel transmission variations. After characterizing these variations, the invention determines the correction to be applied and compresses the data so that it can be used by a unique hardware arrangement for implementing the required video correction to the tiled display.

It is an object of this invention to provide an improved flat-panel, tiled display.

It is another object of this invention to provide a flat-panel, tiled display that is seamless and constructed with matched, color-coordinated tiles.

It is a further object of the invention to provide both a luminance-correcting circuit that uses a reduced amount of correction data, and a real-time correction method for a tiled, LCD display.

SUMMARY OF THE INVENTION

In accordance with the present invention, there is provided a tiled, flat-panel display with a luminance-correcting capability. The display comprises a tiled mosaic of individual LCDs. Column and row inputs that are typically provided for a single LCD system are spread out over a number of LCD tiles. The display is fabricated by sorting the tiles into groups of individual LCDs, and matching their color coordinates prior to assembly. Obtaining a matched set is defined as having the intra-tile average values for each color red, green and blue to fall within a specified range for each tile, as taught in copending U.S. patent application Ser. No. 08/636,604, filed Apr. 23, 1996. The display has a multiplicity of tiles forming a single panel which has the characteristic of seamlessness. A main processor, disposed between a video controller and the display drivers for each of the tiles, accesses a memory containing interpolation coefficients for correcting luminance in the tiles. A computational procedure described hereinafter allows for both a reduction in the amount of data to be stored, as well as a rapid reconstruction of the video correction signal in real time. A multiplicity of processing units are connected to the video controller and the main processor for performing this video correction in real time for each color.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the present invention features a tiled, flat-panel, color display with a luminance-correcting capability. The display comprises a mosaic of individual tiles. Column and row inputs that are typically provided for a single system are distributed over a number of tiles. Luminance correction is achieved for the display by first characterizing the spatial transmission variations in the tiles, and then determining the needed correction. Then, the luminance of each individual tile in the mosaic is corrected via a video circuit.

In the preferred embodiment, measurements of the non-uniformities of the luminance distribution are processed into a set of correction data that can be used in real time to provide the luminance correction in the electronics of the display driving circuit. With the following procedure, the correction data can be compressed into a pair of coefficients for each of a plurality of segments of each row of a display tile. The correction data is reconstructed in real time by a set of linear interpolations that are conducted across the display by a video processor. The compression of the correction data into the set of pairs of coefficients provides a considerable reduction in data over that required if coefficients were stored for each pixel element of the display.

Figure 1:
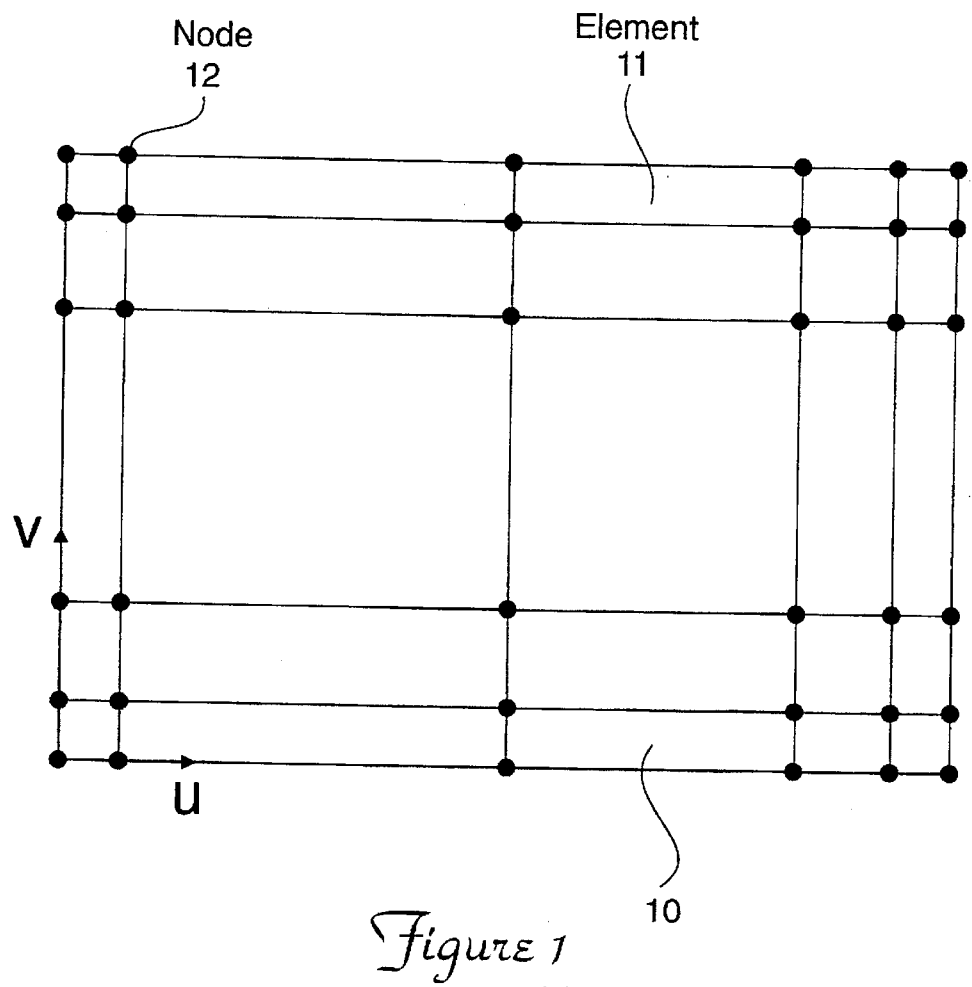
FIG. 1 shows a schematic plan view of a tile that has been segmented into area elements, each of which has its own local u,v coordinate system.

In order to describe the manner in which the video correction is determined, we now refer to FIG. 1, in which a schematic plan view of a tile 10 that has been segmented into rectangular elements 11. Each tile 10 has its own local coordinate system. The corners or nodes 12 need not be uniformly spaced across the display. Luminance data on each tile 10 is collected during manufacture or routine maintenance for each primary color at each node 12 by means of a photoelectric apparatus, such as a Tektronix J16 digital photometer.

The variation of luminance within each rectangular element 11 is described by a linear interpolation equation that is well known in the art, as shown below:

$$F(j)=A(j)+B(j)\times u(j)+C(j)\times v(j)+D(j)\times u(j)\times v(j)$$

where: u corresponds to a relative coordinate within an elemental area along the row direction;

v refers to the relative row location, and further wherein u and v are assumed normalized to reach a maximum value of 1 at a predetermined reference node of an element;

F is the interpolated luminance, with the coefficients A, B, C and D determined from measurements at the corner nodes; and j is an index that refers to the element number.

The A, B, C and D coefficients can be determined from the measured data at the four corners of an element 11 ($f_{00}$, $f_{01}$, $f_{10}$ and $f_{11}$), as follows:

$$A=f_{00},\ B=f_{10}-f_{00},\ C=f_{01}-f_{00},\ \text{and}$$

$$D=(f_{11}+f_{00})-(f_{10}+f_{01})$$

Figure 2A:
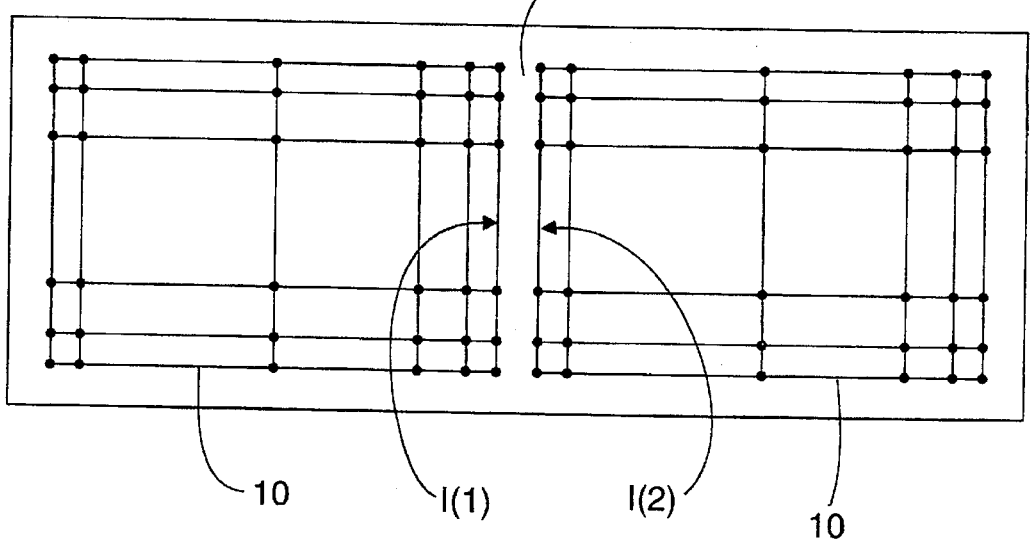
FIG. 2a depicts a schematic plan view of a common border between two tiles.

Referring to FIG. 2a, a schematic view of two adjacent tiles 10 is shown. The tiles 10 have a common border 14. Along the common border 14, the uncorrected luminance is different for each tile and is termed I(1) and I(2). To correct the luminance of each, so that constant luminance is obtained across the border 14, correction data must be applied to each of the RGB signals (primary colors red, green and blue). The correction fades away a short distance from the border 14. A blending function blends the corrected video back into the uncorrected luminance distribution, in regions away from the border, as if the correction had not been employed.

PROCEDURE FOR CORRECTING LUMINANCE

1. Compute the difference between the luminance across the border, from D=I(2)–I(1). Subtract one-half of the difference, D/2, from I(2), but add D/2 to I(1). The new modified I's are now the same, providing the required luminance-matching across the tile boundary.

2. Subtract a constant from both sides, so that the new luminance distribution does not exceed the old value at any point.

3. From the corrections to the Is described in procedures (1) and (2), form a luminance correction factor G along the border of each tile: G=(Corrected I)/(uncorrected I). From the measured transfer characteristic between luminance and video data for each primary color, for each tile convert the luminance correction factor, G, to a video data correction factor, H.

4. By using a suitable blending function, B(u,v), form a set of two-dimensional video correction data at each node. An example of a blending function is a linear multiplier that converts any H distribution along the border at u+1 into a constant value of unity, at a blending distance, d. Where blending is complete, the u coordinate is termed:

$$u_B=1-d$$

A specific example is given for piecewise linear function:

$$B_1(u,v)=1,\ for\ u<u_B,\ and\ any\ v;$$

$$B_1(u,v)=[(1-u)+H(v)\times(u-u_B)/(1-u_B)],\ for\ u>u_B$$

Figure 2B:
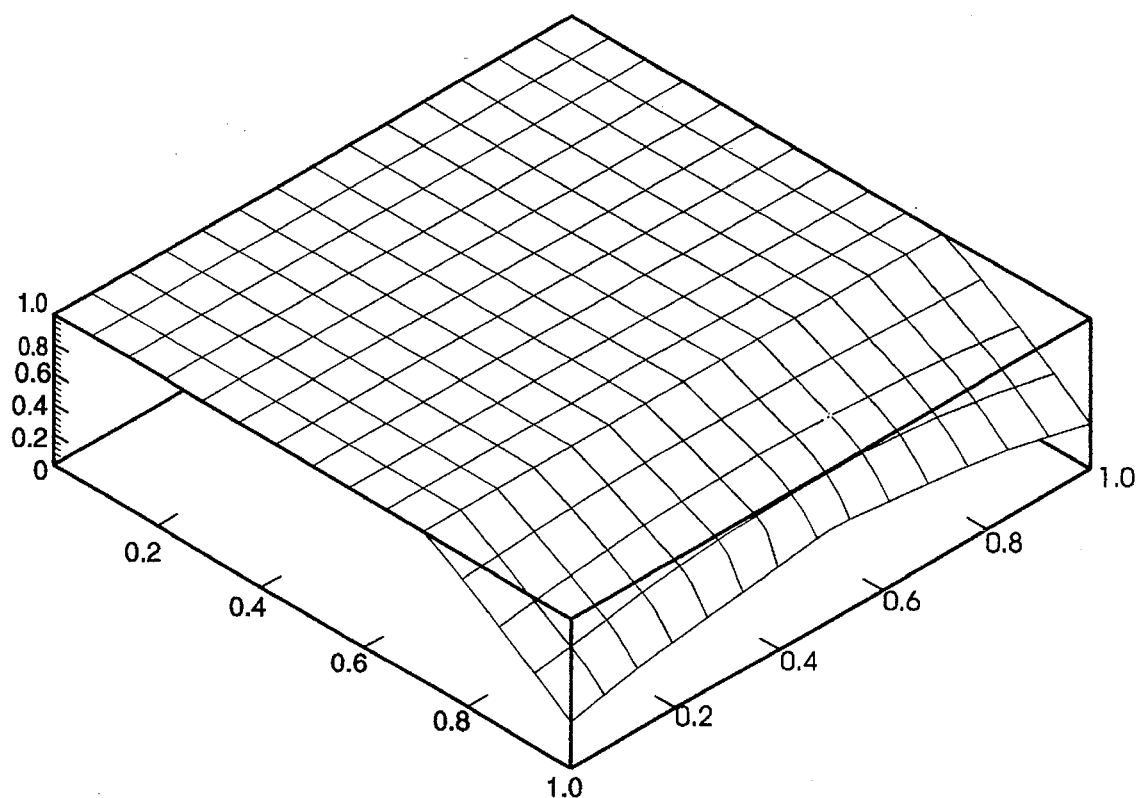
FIG. 2b illustrates a three-dimensional view of a linear blending function.

(See FIG. 2b).

5. From the blended video corrections at the nodes, compute the coefficients of a new set of interpolating function corrections H. The coefficients are given as P, Q, R and S for the jth element and are determined by a similar procedure as that used previously for F. The equation for H is:

$$H(j)=P(j)+Q(j)xu(j)+R(j)xv(j)+S(j)xu(j)xv(j)$$

where j is the sequential index counting all of the elements in all of the tiles.

6. Compute the pairs of coefficients by separating row (term with v) and column (term with u) operations:

$$H=(P+Rxv)+(Q+Sxv)xu, \text{ or, } H=L(v)+M(v)xu$$

The pairs of coefficients L and M are preferably calculated only once (e.g., during a set-up procedure at the factory, or periodically during maintenance procedures), and can be accessed by the video processor from a look-up table contained in memory, in which the look-up table is entered during initialization. The entire above procedure can be incorporated within a computer program and become a routine set-up procedure. There is a separate linear equation for each row of each element of each tile, and a complete set for each primary color.

The above procedure provides a best-fit correction algorithm for two adjacent tiles. It is possible to generalize the above algorithm for a more complex case of a two-dimensional array of tiles, where all the borders have been luminance- corrected, and fully two-dimensional blending functions are employed. These more complex situations can be determined by using iterative techniques well known in the art of numerical analysis, in which corrections along the v-directed borders are made, and then those along the u borders made. The process is repeated until the necessary uniformity has been obtained.

Figure 3:
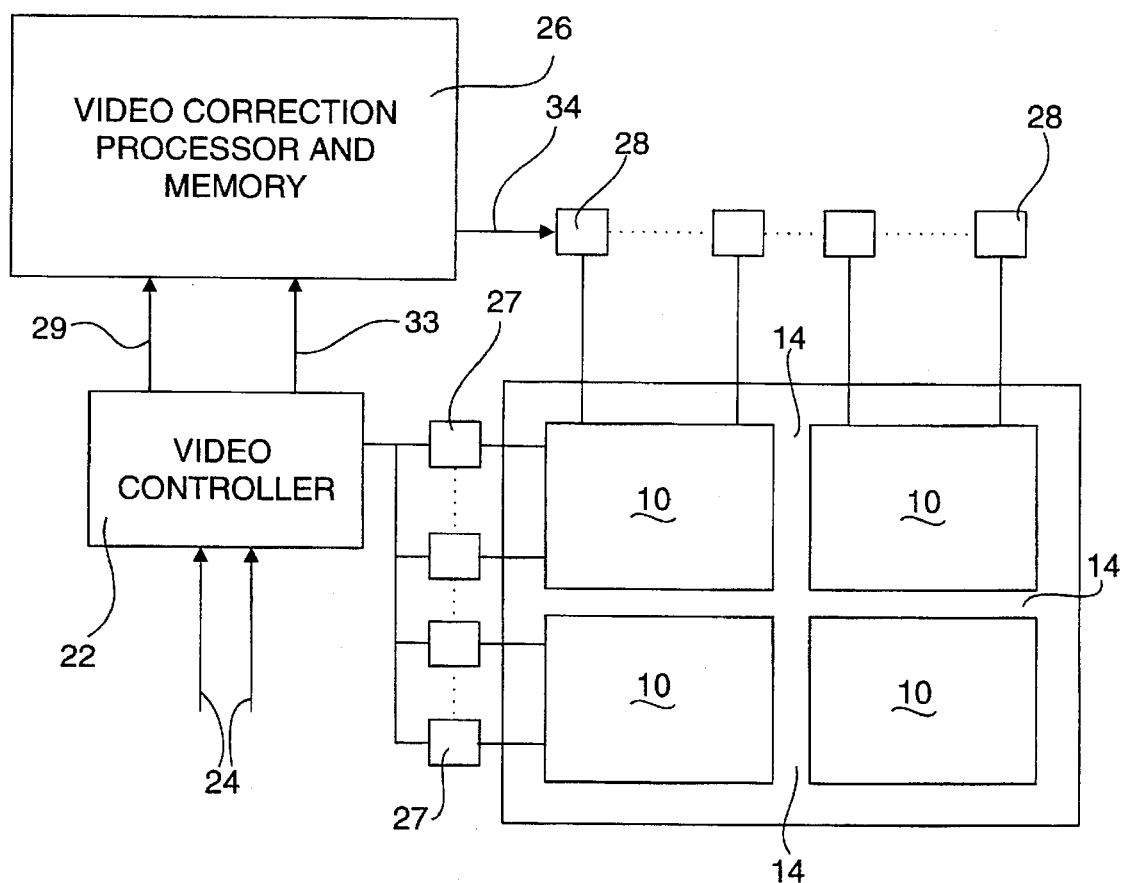
FIG. 3 illustrates a diagram of an FPD display circuit that has the added function of luminance correction, in accordance with this invention.

Referring to FIG. 3, a diagram of a circuit for luminance correction, in accordance with this invention, is shown. The tiled display shown is connected to row-driving electronic circuits 27, and column-driving circuits 28. Incoming video in digital form is obtained from the controlling computer via data and control signals 24; they are then fed to video controller 22. Video controller 22 supplies uncorrected data 29 and timing signal 33 to video processor 26. Corrected data 34 is then provided to column drivers 28. The luminance should substantially match across all the tile borders 14. To accomplish this, an additional video processor 26 is introduced into the familiar display-driver electronics. The control processor 22 of the video driver is continuously providing row and column address signals, as well as other control signals. These signals are also provided, as aforementioned, to video processor 26.

The corrected digital video data is provided to a digital-to-analog (DAC)-like circuit in each of the plurality of column drivers 28, which converts the digital data into analog form, as is well known in the art. For example, in an AMLCD display, this data is then applied to the LCD light-valve storage capacitor (not shown) of each pixel through the thin film transistor (TFT) contained within each pixel cell. The converted analog voltage controls the amount of light transmitted through a pixel, which produces a small part of the image. A separate signal is provided for each primary color. Other FPDs are handled in a similar fashion.

Figure 4:
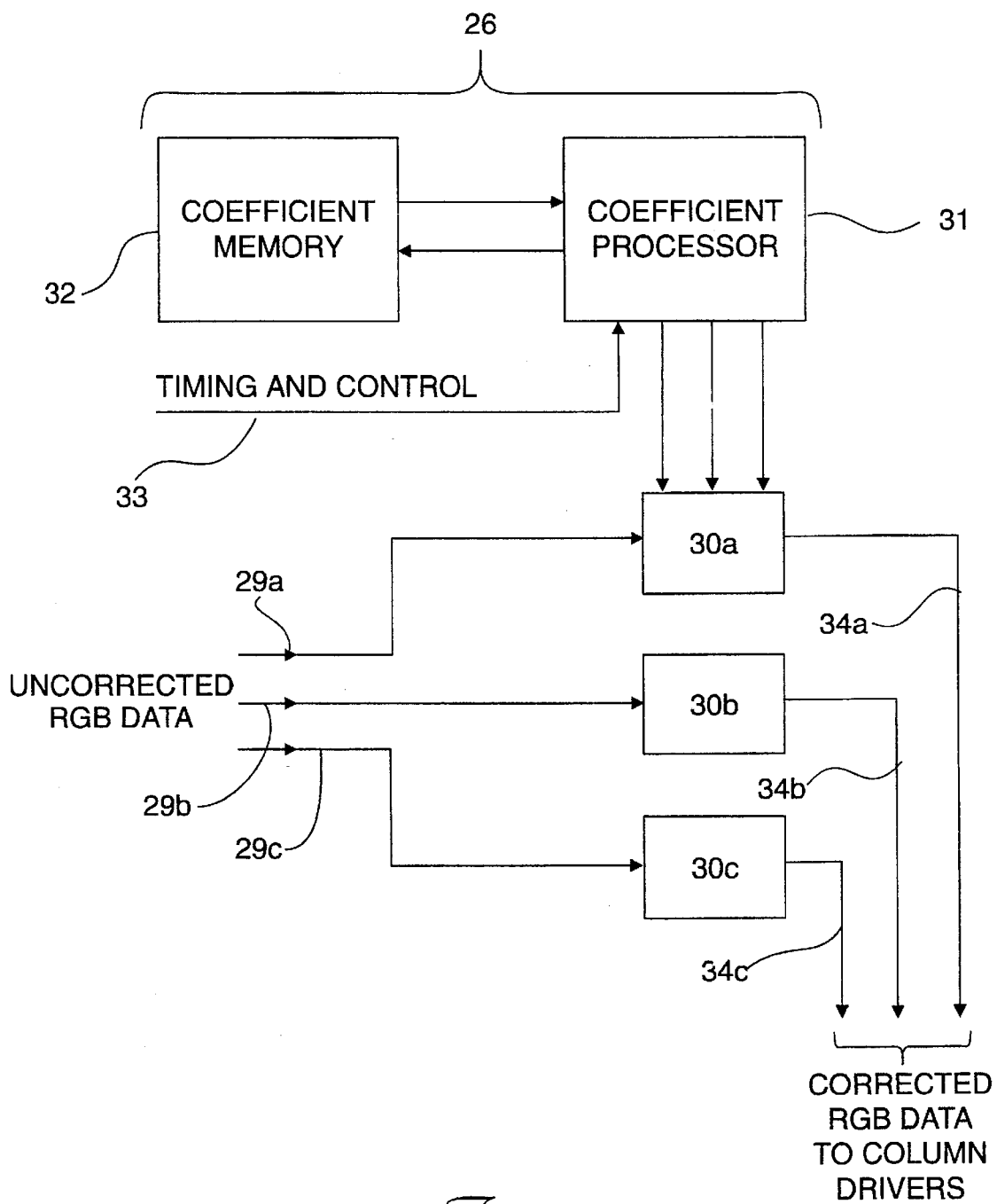
FIG. 4 shows the detailed signal flow that takes place in the luminance-correction circuit of this invention.

The additional processor 26 in FIG. 4 is required between the video controller 22 and the display drivers 28. This processor 26 comprises a fast computing unit 31 and an associated coefficient memory 32 that contains the data on the entire set of interpolation coefficients for all of the tiles in the display. The processing units for each primary color 30a, 30b and 30c, respectively, are used to perform the video correction and generate signals 34a, 34b and 34c in real time by a multiplying or scaling operation.

EXAMPLE

Consider a 4×4 tile array, where each tile contains a pixel display of resolution 640×480, and each tile has been decomposed into an array of 4×5 elements. The number of coefficients is the product of the following terms:

2=number of coefficients L,M,

3=number of primary colors,

4×4=16=number of tiles, 480 32 number of vertical rows per tile,

5=number of elements along a row direction of a tile.

Multiplying these results (2×3×16×480×5)=230 k bytes, if coefficients are one byte long. This is a considerable reduction in storage for a display that contains (4×4×640× 480×3)=14.7 million color elements.

The form of the L,M equations allows for simple, real-time calculation to be performed by processor 31 from the L,M coefficients stored in memory 32 (a multiplication followed by an addition), H=L+Mx u. An H value is computed for each primary color. The H values are the scaling parameters that are applied on a pixel-by-pixel basis. The H values are made available by processor 31 at the proper time for the processing units 30a, 30b and 30c, so that the video data can be corrected in real time.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A system for controlling luminance of regions in a multi-tiled, substantially flat, video display, said display having a plurality of rows (control) and columns (data) of pixels, said system comprising:

a) graphics-controlling means for generating a digital video signal;

b) a display controller operatively connected to said graphics-controlling means for receiving said digital video signal and for generating an address signal;

c) memory means comprising predetermined coefficient data, and video processing means; said memory and video processing means being respectively and operatively connected to display controller for receiving said address signal and for generating a luminance-correction signal as a function of said coefficient data, said luminance-correction signal being used to create substantial uniformity of luminance across the tiles in a multi-tiled video display; and d) column-driving means operatively connected to said memory means and said display controller, for receiving said signals therefrom and for driving columns of pixels on said video display.

2. The system for controlling luminance of regions in a multi-tiled, substantially flat, video display in accordance with claim 1, wherein said memory means comprises a static RAM.

3. The system for controlling luminance of regions in a multi-tiled, substantially flat, video display in accordance with claim 1, wherein said regions of said display comprise (i) border regions proximate the periphery of each of said tiles and (ii) internal regions displaced from said border regions, wherein said luminance-correction signal is principally applied to said border regions so that the luminance thereof is smoothly blended into the luminance of said internal regions.

4. The system for controlling luminance of regions in a multi-tiled, substantially flat, video display in accordance with claim 1, wherein said video processing means comprises an ASIC chip.

5. The system for controlling luminance of regions in a multi-tiled, substantially flat, video display in accordance with claim 1, wherein said video processing means comprises a digital signal processing (DSP) chip.

6. The system for controlling luminance of regions in a multi-tiled, substantially flat, video display in accordance with claim 1, wherein said multi-tiled, substantially flat, video display comprises an AMLCD display.

7. The system for controlling luminance of regions in a multi-tiled, substantially flat, video display in accordance with claim 6, further comprising:
   e) gate-driving means operatively connected to said display controller for generating a signal to drive the gates of said AMLCD display.

8. The system for controlling luminance of regions in a multi-tiled, substantially flat, video display for blending away from peripheries of tiles in accordance with claim 7, further comprising:
   f) region-decoding means operatively connected to said memory means and said video processor, for receiving signals generated thereby and for accessing said coefficient data.

9. The system for controlling luminance of regions in a multi-tiled, substantially flat, video display in accordance with claim 3, wherein said predetermined coefficient data is generated by:
   measuring the luminance taken at predetermined locations of each tile on said display;
   fitting said measurements to a set of algebraic equations to determine appropriate parameters of fitting; and
   processing said parameters of fitting in accordance with a blending function to determine a suitable luminance correction whose principal values are proximate the edge of each tile.

10. The system for controlling luminance of regions in a multi-tiled, substantially flat, video display in accordance with claim 9, wherein data representative of said luminance-correction signal is further processed and compressed into a set of algebraic equations, the coefficients of which equations are stored in said memory means so that corrections can be substantially reproduced on a real time basis.

11. A system for controlling luminance of regions in a multi-tiled, substantially flat, video display, said display having a plurality of rows (control) and columns (data) of pixels, said system comprising:
   a) digital video signal generating means for generating a digital video signal;
   b) a video controller operatively connected to said digital video signal generating means for receiving said digital video signal and for generating an address signal;
   c) storage means comprising predetermined coefficient data, said storage means being operatively connected to said video controller;
   d) video processing means operatively connected to said storage means and to said video controller for receiving said address signal and for generating a luminance-correction signal as a function of said coefficient data, said luminance-correction signal being used to create substantial uniformity of luminance across the tiles in a multi-tiled video display; and
   e) column-driving means operatively connected to said video controller, for receiving said signals therefrom and for driving columns of pixels on said video display.

12. The system for controlling luminance of regions in a multi-tiled, substantially flat, video display in accordance with claim 11, wherein said storage means comprises a static RAM.

13. The system for controlling luminance of regions in a multi-tiled, substantially flat, video display in accordance with claim 11, wherein said video controller comprises an ASIC chip.

14. The system for controlling luminance of regions in a multi-tiled, substantially flat, video display in accordance with claim 11, wherein said video processing means comprises a digital signal processing (DSP) chip.

15. The system for controlling luminance of regions in a multi-tiled, substantially flat, video display in accordance with claim 11, wherein said multi-tiled, substantially flat, video display comprises an AMLCD display.

16. The system for controlling luminance of regions in a multi-tiled, substantially flat, video display in accordance with claim 15, further comprising:
   f) gate-driving means operatively connected to said video controller for generating a signal to drive the gates of said AMLCD display.

17. The system for controlling luminance of regions in a multi-tiled, substantially flat, video display in accordance with claim 16, further comprising:
   g) region-decoding means operatively connected to said storage means and to said video controller, for receiving signals generated thereby and for accessing said coefficient data.

18. The system for controlling luminance of regions in a multi-tiled, substantially flat, video display in accordance with claim 11, wherein said regions of said display comprise (i) border regions proximate the periphery of each of said tiles and (ii) internal regions displaced from said border regions, wherein said luminance-correction signal is principally applied to said border regions so that the luminance thereof is smoothly blended into the luminance of said internal regions.

19. The system for controlling luminance of regions in a multi-tiled, substantially flat, video display in accordance with claim 18, wherein said predetermined coefficient data is generated by:
   measuring the luminance taken at predetermined locations of each tile on said display;
   fitting said measurements to a set of algebraic equations to determine appropriate parameters of fitting; and
   processing said parameters of fitting in accordance with a blending function to determine a suitable luminance correction whose principal values are proximate the edge of each tile.

20. The system for controlling luminance of regions in a multi-tiled, substantially flat, video display in accordance with claim 19, wherein data representative of said luminance-correction signal is further processed and compressed into a set of algebraic equations, the coefficients of which equations are stored in said storage means so that corrections can be substantially reproduced on a real time basis.

* * * * *